Figure 1:
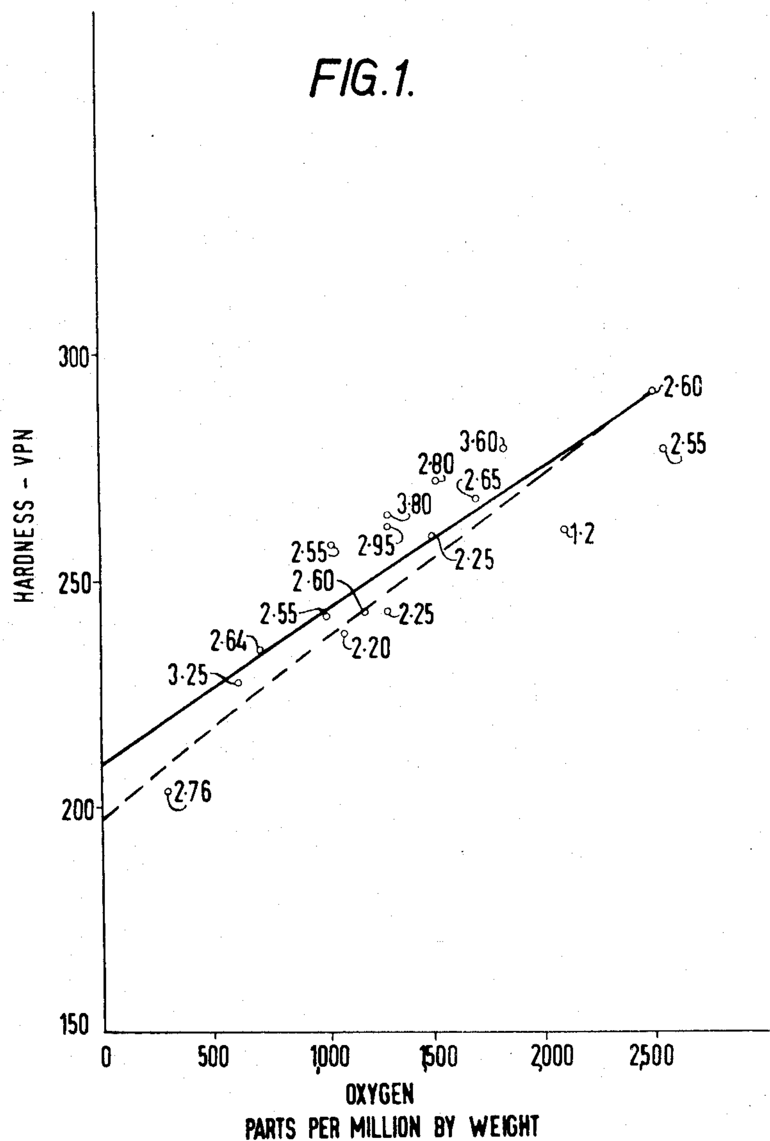

ZIRCONIUM BASE ALLOYS

Filed March 23, 1964 2 Sheets-Sheet 1

Sept. 6, 1966 J. WINTON ET AL 3,271,205

ZIRCONIUM BASE ALLOYS

Filed March 23, 1964 2 Sheets-Sheet 2

United States Patent Office 3,271,205

Patented Sept. 6, 1966

3,271,205
ZIRCONIUM BASE ALLOYS

John Winton and Robert Murgatroyd, Warrington, England, assignors to United Kingdom Atomic Energy Authority, London, England Filed Mar. 23, 1964, Ser. No. 353,790
Claims priority, application Great Britain, Mar. 27, 1963, 12,201/63
5 Claims. (Cl. 148—133)

The present invention relates to zirconium base alloys containing niobium. Zirconium is attractive for use in nuclear reactors because of its low capture cross section for neutrons and has been found to give a low corrosion rate in steam or water at high temperatures when alloyed with small amounts of other elements. Niobium as a binary addition appears to give satisfactory properties for use in aqueous coolant of a nuclear reactor when in an amount of about 2½% by weight.

In addition to corrosion resistance, the desired properties include high strength coupled with ductility. Generally speaking, increased strength makes possible a reduction of wall thickness for given operating conditions and therefore the amount of parasitic material in the nuclear reactor core can be reduced with consequent economy in the overall cost of power generation.

Strength improvement is obtainable by the heat treatment of quenching followed by a prolonged reheating known as ageing or tempering.

As a result of the appreciation that the strength obtainable by quenching increases with increasing oxygen content in the alloy, the invention provides a method for strengthening a zirconium base alloy containing niobium which comprises introducing oxygen into the alloy to give an oxygen content in the range 1000 to 2000 parts per million by weight. This method further comprises the steps of quenching the alloy from a sufficiently high temperature to effect conversion predominantly to the beta phase, and subsequently ageing the alloy for a period in excess of two hours, these steps being based on the finding that with lower quenching temperatures the strength of the oxygen-containing alloy tends to deteriorate as the ageing times are extended. Quenching in the present context implies a rate of cooling, as in water, which is in excess of 100° C. per minute and therefore sufficiently rapid to bring about a martensitic transformation of the beta phase without appreciable precipitation concurrently of the niobium content. The growth of beta phase crystals resulting from the quenching does not significantly impair the ductility of the final alloy product and a marked gain in strength is achieved. The ageing achieves in the martensitic structure a fine dispersion of second phase precipitate which is rich in niobium; together with the oxygen content this characterises the product in accordance with the invention. To introduce a specified oxygen content in accordance with the invention, there may be included at the stage of melting the alloy the step of adding oxygen, as by the addition of zirconium oxide. The method of the invention has a primary application to binary alloys of zirconium with niobium in the range from 1 to 4% by weight; it has been established for a large part of this range that the increase in quenched strength by increasing oxygen content is independent of the amount of niobium.

However, the subsequent ageing is found to be dependent for its effect on the niobium as well as the oxygen. Thus, for this purpose an increase in the amount of niobium is to be preferred, and for the binary alloys mentioned previously this preference implies an amount of niobium greater than 2.5% by weight. It follows that higher levels of oxygen can act as a substitute for lower levels of niobium and therefore the sort of relationship which is likely to apply for a given strength gain from the ageing treatment is that 600 parts per million of oxygen is equivalent to about 0.2% of niobium.

In the case of the binary alloy of zirconium with 2½% by weight of niobium the transition between the mixed alpha plus beta phase and the pure beta phase occurs on present evidence at about 950° C. and therefore to effect complete conversion to the beta phase this particular alloy should be heated to a temperature in excess of 950° C., and even to 1000° C. Even for only predominant conversion, a quench temperature in these regions is likely to be specified to ensure that nowhere in the bulk of the alloy is the temperature less than 875° C. The significance of this minimum will appear subsequently.

Ageing may be carried out at a temperature in the range 475 to 525° C. over a period of between two and twenty-four hours or even more. The longer ageing times (twenty-four hours for example) have proved beneficial for high temperature corrosion resistance.

In the accompanying drawings, FIGURE 1 shows for binary material quenched in water from a uniform temperature of 875° C. the increasing quenched hardness expressed in terms of VPN (Vickers Pyramid Number) which results from increasing the oxygen content, these hardness figures being directly reflected in the ultimate tensile strength. Against the various points in this figure are noted the amount in percentage by weight of the niobium binary addition. The solid line through these points shows the general trend. For comparison the broken line shows the general trend obtained in respect of the binary material when quenched in water from a uniform temperature of 1000° C.

Figure 2:
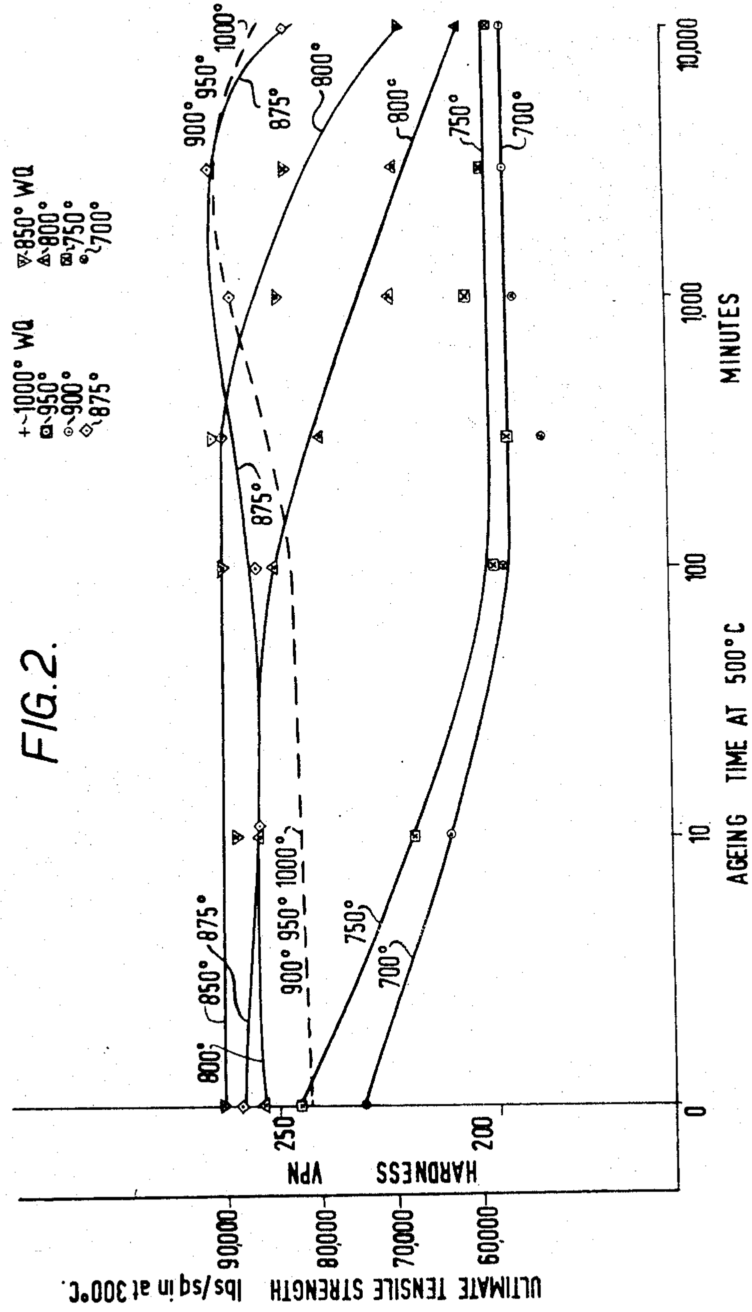

In FIGURE 2 is shown for binary material having 2.6% of niobium and 1100 parts per million of oxygen the effect of quenching temperature on the response to ageing at 500° C. The quenching temperatures are marked against the curves which have been drawn through the various points and it will be seen that the inflection which occurs in all cases within a few hours of the ageing treatment is in the direction of decreasing hardness for quenching temperatures of less than 875° C.; only at this temperature and above is the inflection upwards in the direction of increasing hardness. For this reason the maximum of 875° C. is specified for the quenching temperature. The ultimate tensile strength at 300° C. is shown in FIGURE 2 against the hardness scale.

By way of illustration of the effect of niobium content on the ageing response, the ageing of beta quenched binary alloy at 500° C. has given with an oxygen content of 1400 parts per million by weight an increase in hardness of 18 VPN for an amount of niobium about 2½% by weight and 35 VPN for an amount of niobium about 3% by weight.

To meet a specification of an ultimate tensile strength at 300° C. of at least 80,000 p.s.i., suitable combinations for the binary alloy would be found in the ranges of 2.5 to 3.0% by weight for the niobium and 1100 to 1600 parts per million by weight for the oxygen. The figures of 2.6 and 1100 as for FIGURE 2 are a representative specification. This order of strength is an illustration of what is desirable for the pressure tubes in a heavy water moderated reactor. The effects attributed herein to the oxygen content are consistent with the theory that it decreases the amount of niobium capable of being held in solid solution in the primary phase at the ageing temperature. It is to be understood that hot or cold working steps may be employed following the heat treatment. Working may be employed for obtaining the desired fineness of grain and distribution of the precipitate.

What we claim is:

1. A method for strengthening a zirconium base alloy containing niobium which comprises introducing oxygen into the alloy to give an oxygen content in the range 1000 to 2000 parts per million by weight, raising the alloy to a sufficiently high temperature to effect conversion predominantly to the beta phase quenching the alloy from that temperature, and subsequently ageing the alloy for a period in excess of two hours.

2. A method as claimed in claim 1, in which the alloy is a binary alloy with 1 to 4% by weight of niobium.

3. A method as claimed in claim 2, in which the alloy is aged for about 24 hours at a temperature in the range 475 to 525° C. and the quenching is from a temperature not less than 875° C. throughout the alloy.

4. A method for strengthening a binary alloy of zirconium with 2.5 to 3% by weight of niobium which comprises introducing oxygen into the alloy to give an oxygen content in the range 1100 to 1600 parts per million by weight, raising the temperature of the alloy to a temperature not less than 875° C. throughout the alloy, quenching the alloy in water from that temperature, and subsequently ageing the alloy at a temperature in the range of 475 to 525° C. for a period in excess of two hours.

5. A binary alloy of zirconium with 1 to 4% by weight of niobium and having an oxygen content in the range 1000 to 2000 parts per million by weight, such alloy being predominantly of martensitically transformed beta phase with a fine dispersion of a second phase precipitate rich in niobium.

References Cited by the Examiner

GEAP-4089 (vol. 1), "Proceedings of the USAEC Symposium on Zirconium Alloy Development," Nov. 30, 1962, pp. 4-2 to 4-10 and 11-0 to 11-32 (41 pages).

BENJAMIN R. PADGETT, *Primary Examiner.*

CARL D. QUARFORTH, REUBEN EPSTEIN, LEON D. ROSDOL, *Examiners.*

M. J. SCOLNICK, *Assistant Examiner.*